(12) United States Patent
Schäfer et al.

(10) Patent No.: US 6,679,568 B1
(45) Date of Patent: Jan. 20, 2004

(54) BLOCK-PROTECTED BRAKING SYSTEM

(75) Inventors: Daniel Schäfer, Ochtendung (DE); Leo Gilles, Koblenz (DE)

(73) Assignee: Lucas Industries public limited company, Solihull (GB)

(*) Notice: Subject to any disclaimer, the term of this patent is extended or adjusted under 35 U.S.C. 154(b) by 0 days.

(21) Appl. No.: 09/770,910

(22) Filed: Jul. 17, 1996

Related U.S. Application Data

(63) Continuation of application No. PCT/EP95/00493, filed on Feb. 10, 1995.

(30) Foreign Application Priority Data

| Feb. 10, 1994 | (DE) | 44 04 273 |
|---|---|---|
| Sep. 9, 1994 | (DE) | 44 32 165 |

(51) Int. Cl.⁷ ................................................ B60T 8/34
(52) U.S. Cl. .............................. 303/119.3; 303/DIG. 10
(58) Field of Search ....................... 303/DIG. 10, 116.4, 303/119.3

(56) References Cited

U.S. PATENT DOCUMENTS

| 5,407,260 A | * 4/1995 | Isshiki et al. ............. 303/119.3 |
| 5,452,948 A | * 9/1995 | Cooper et al. ............ 303/119.3 |
| 5,513,905 A | * 5/1996 | Zeides et al. ............. 303/119.3 |
| 5,853,231 A | * 12/1998 | Iwamura et al. .......... 303/119.3 |
| 5,988,772 A | * 11/1999 | Hashida .................... 303/119.3 |
| 6,059,381 A | * 5/2000 | Bayer .................. 303/DIG. 10 |
| 6,145,543 A | * 11/2000 | Ohishi et al. ............. 303/119.3 |

FOREIGN PATENT DOCUMENTS

| DE | 3813138 | 11/1989 |
| DE | 3813139 | 11/1989 |
| DE | A8910805 | 2/1991 |
| DE | A4001017 | 7/1991 |
| EP | 0105219 | 4/1984 |
| EP | 0438553 | 7/1991 |
| EP | A0604111 | 6/1994 |
| WO | A9214927 | 9/1992 |
| WO | A9308050 | 4/1993 |

* cited by examiner

Primary Examiner—Matthew C. Graham
(74) Attorney, Agent, or Firm—Wood, Herron & Evans, LLP.

(57) ABSTRACT

The invention relates to a block-protected braking system for a vehicle, comprising an electronic controller (22, 24) arranged in a housing (12), a valve block (14) to accommodate solenoid valves for controlling the hydraulic fluid in the braking system, and a pump motor (16) for a pump which delivers hydraulic fluid, with the solenoids (20) of the valves being accommodated in an intermediate body (18) which is arranged between the valve block (14) and the housing (12) of the electronic controller, said intermediate body (18) comprising electric connecting means (34, 38) for connecting the electronic controller with the solenoids (20), and said valve block (14) and said housing (12) of the electronic controller being connected with each other by means of the intermediate body (18).

15 Claims, 5 Drawing Sheets

BLOCK-PROTECTED BRAKING SYSTEM

This application is a continuation of PCT Application PCT/EP95/00493 filed Feb. 10, 1995.

The invention relates to a block-protected braking system for vehicles with the characteristics of the preamble clause of claim 1, as it is known from DE 40 01 017 A1. This known arrangement, however, does not show the connection between the valve block and a pump motor for a pump which delivers a hydraulic fluid.

The term "block-protected braking system" herein refers to a unit which prevents the blockage of braked wheels of a vehicle and, if required, also the spinning of driven wheels (so-called antislip control—ASC). Such a unit comprises at least the following assemblies: an electronic controller which generally includes a computer which derives instructions for the control of the braking system depending on measured data (such as e.g. deceleration and acceleration values of the wheels), a valve block which in particular accommodates solenoid valves for controlling the hydraulic fluid in the braking system, with the valves being opened or closed, respectively, in accordance with the instructions generated by the computer, and a pump motor which drives a pump which delivers the hydraulic fluid to the master cylinder and/or the wheel brakes of the vehicle, if the valves are set accordingly.

The system assemblies valve block, pump, and pump motor are often designated as the "hydraulic power unit".

The present invention relates to the arrangement, assembly and connection of the cooperating assemblies electronic controller, valve block, pump motor and pump.

From the state of the art a variety of arrangements of the mentioned assemblies of a block-protected braking system is known. Particular reference shall be made to EP-A-0 105 219, DE-A-38 13 138 and DE-A-38 13 139.

With respect to the geometrical arrangement of the above-mentioned components and their electrical and mechanical connections, it is of essential importance to achieve an assembly as compact (minimum space requirement) as possible. Moreover, lines for the electrical connections (in particular cable trees) are to be reduced with respect to circumference and length, and the assembly of the parts must be as simple as possible. In addition, the entire arrangement should be limited to as few components as possible. Moreover, the connection of the individual components shall be electrically and mechanically safe and have a low susceptibility to failures. The subject matter of the present invention implies an improvement with respect to all these technical problems.

In view of the above-mentioned set of technical objects, the electrical and mechanical assembly of the pump motor according to the state of the art need to be improved. It is also to be noted that under the aspect of the above-mentioned mechanical and, especially, electrical safety of assembly and connection of the components, a sealing of the housing which encompasses the components becomes necessary, especially a sealing against humidity, dirt, etc.

EP-A-0 438 553 discloses a valve block where the solenoids of the valves are combined on a common contact carrier which also contains common connectors for connecting the solenoids with the electronic controller of the braking system. However, an integration of the electrical and mechanical assembly of the pump motor is not provided.

From WO 93/08050 A1 an electrohydraulic unit for the pressure regulation in vehicle braking systems is known, where the valve block is connectd with a pump motor for a pump delivering hydraulic fluid. In this arrangement the pump motor, however, is not provided with a shoulder which fits into a recess in the intermediate body.

In view of the technical problems as mentioned the invention improves a block-protected braking system of the above-mentioned type by the characteristics of claim 1.

In that the pump motor (or a housing which accommodates the pump motor) comprises a shoulder which is inserted in an accurately fitting and positive manner into a recess in the intermediate body, and which contains an electrical connection line for connecting the pump motor with the electronic controller, a mechanical and electrical connection of the pump motor with the electronic controller and also with the valve block is obtained simultaneously. The intermediate body serves both as an electrical and a mechanical connecting member for all three assemblies, i.e. the electronic controller, the valve block and the pump motor.

Preferred embodiments of the block-protected braking system are described in the dependent claims.

A particularly consequent application of the inventive design is obtained if the pump motor and the housing of the electronic controller area also connected to one anothr by means of the intermediate body.

Thus, the invention provides for the connection of the electronic controller and the hydraulic power unit (see above) via an intermediate body which carries all the solenoids of the valves of the hydraulic power unit. A direct electrical connection from a printed circuit board of the electronic controller via plug and socket contacts is made to connection lines which lead to the solenoids. These connection lines are accommodated in the intermediate body and electrically insulated therein.

The inventive arrangement of the components is advantageous in that only two seals are required as a protection particularly of the electronic controller against environmental influences (humidity, dirt, etc.), one of which is disposed between the housing of the electronic controller and the other is disposed between the intermediate body and the pump motor. According to a preferred embodiment the latter is a seal between the intermediate body and a shoulder at the pump motor.

The intermediate body which serves to connect the components electrically and mechanically can be manufactured as an economical injection-molded plastic part, with the solenoids together with the electrical conductors being embedded. The electrical conductors can also be manufactured in a simple manner as a punched grid.

It is also advantageous that the braking system according to the invention allows the arrangement of the electronic controller beneath the hydraulic power unit. This enables a particularly compact arrangement of the parts.

According to another preferred embodiment of the invention, the pump motor comprises a shoulder which is independent (spatially separated) of the intermediate body and which accommodates an electrical connection between the electronic controller and the pump motor. This separation between the housing and the valve block on the one hand, and the housing and the pump motor on the other hand, enables a shorter line routing and provides for a better decoupling of the respective signals. Moreover, the intermediate body can be of a simpler design because it is not adapted to encompass the shoulder.

In order to obtain a particularly stable connection between the housing and the valve block and between the the housing and the pump motor which is also reliably sealed against dust, humidity, oil, etc. the housing comprises a first support for the intermediate body and a second support for the shoulder. In a particularly preferred embodiment, the first and the second support are connected with the housing in a dustproof and/or hermetically sealed manner.

In addition, the first and/or the second support can be connected with a printed circuit board in the housing in a dustproof and/or hermetically sealed manner. This allows a further increase of the reliability.

The electric connection between the pump motor and the housing of the electronic controller can also be be made by means of plug and socket contacts, with the second support accommodating plug and socket contacts between the electronic controller and the pump motor.

Each of the first and/or second support is preferably provided with a seal which ensures a dustproof and/or hermetically sealed connection between the valve block or the pump motor and the housing, respectively.

According to a preferred embodiment the intermediate body and/or the shoulder are arranged laterally adjacent to or in a recess in a supporting plate of the valve block or the pump motor, respectively, and provide for the connection between the first or the second support, respectively. In addition, the housing of the electronic controller can be secured at the supporting plate e.g. by means of a suitable screw connection. This is advantageous in that the overall arrangement has a considerably flatter design than the first embodiment because the transverse dimension of the intermediate body is omitted here. Moreover, the cooling function is improved because the housing of the electronic controller is directly contacting the heat conductive (metallic) supporting plate which in turn contacts the heat conductive valve block which is also heat conductive due to the omission of the intermediate body.

In a preferred embodiment the first and/or second support each are encompassed by a seal which bears upon the respective support in an axial and a radial direction, and the intermediate body or the shoulder, respectively, encompasses the respective seal.

The supporting plate can additionally be screwed to the valve block and/or to the pump motor. In particular, this can also be done by means of screw-type formed dampening chamber plugs which are already present a larger volume of the dampening chamber can be provided by a corresponding shape of the dampening chamber plug.

In the following, an embodiment of the invention will be described in more detail with reference to the drawing, in which:

FIG. 1 shows a unit 10 with the following assemblies of a block-protected braking system:

Figure 1:
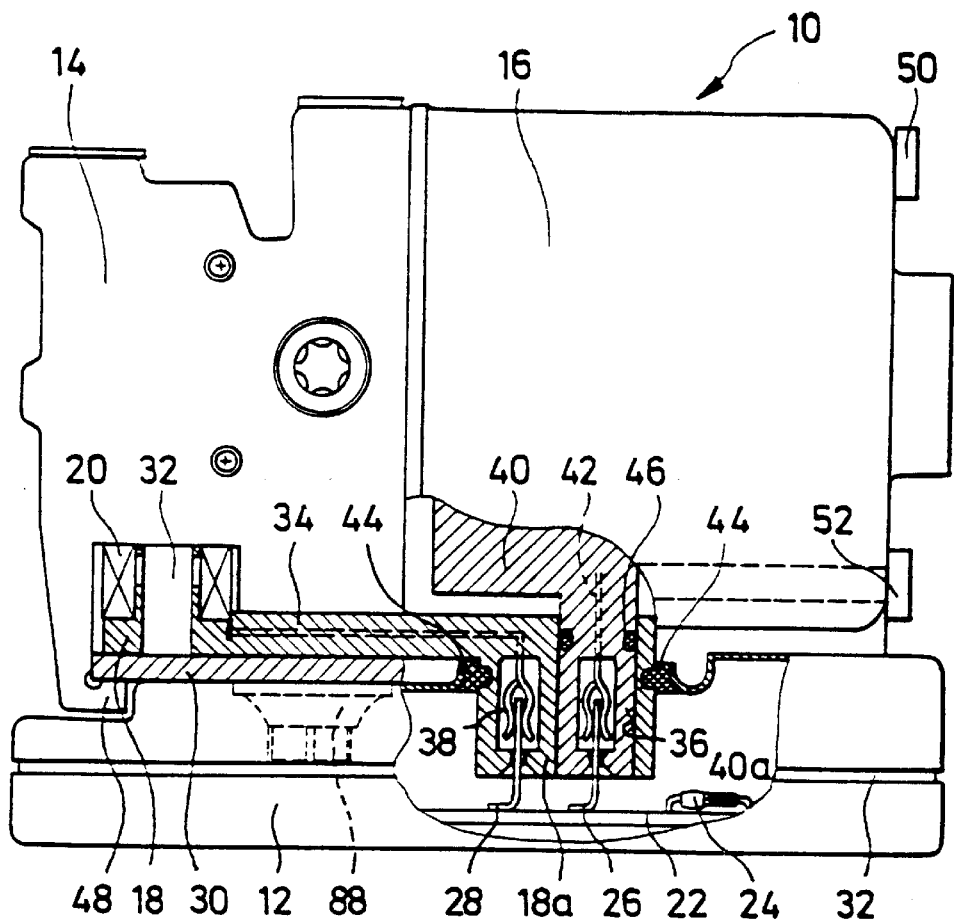
FIG. 1 is a schematic, partially sectional, side view of the assemblies of interest of a block-protected braking system.

An electronic controller of the braking system accommodated in a housing 12, with the electronic controller indicated here by a printed circuit board 22 and symbolically by a circuit element 24 only; a valve block 14 which accommodates the solenoid valves required for a block-protected braking system (if required, with ASC) and associated line parts (which are connected with the individual wheel brakes of the vehicle—not shown); and a pump motor 16 which drives a pump which delivers hydraulic fluid in a manner known per se to the master cylinder and/or the wheel brakes (not shown). In the illustrated first embodiment the pump (usually a piston pump) is arranged in the valve block 14.

For the electrical and mechanical connection and the assembly of the mentioned assemblies 12, 14 and 16, an intermediate body 18 made from plastic material is used. The intermediate body 18 is arranged vertically above the housing 12 of the electronic controller and accommodates all solenoids 20 for the individual solenoid valves of the valve block 14.

Figure 2:
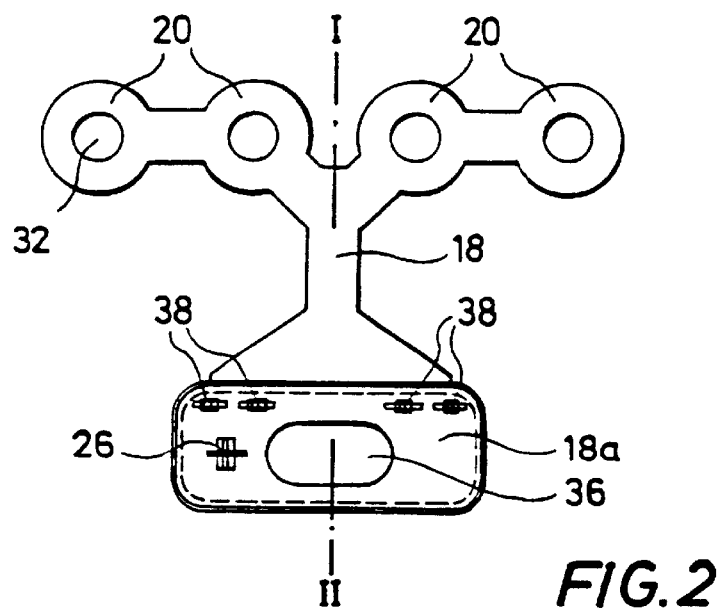
FIG. 2 is a plan view of an intermediate body which is used in an arrangement according to FIG. 1, with FIG. 1 showing a sectional view through the intermediate body along line I–II in FIG. 2.
Figure 3:
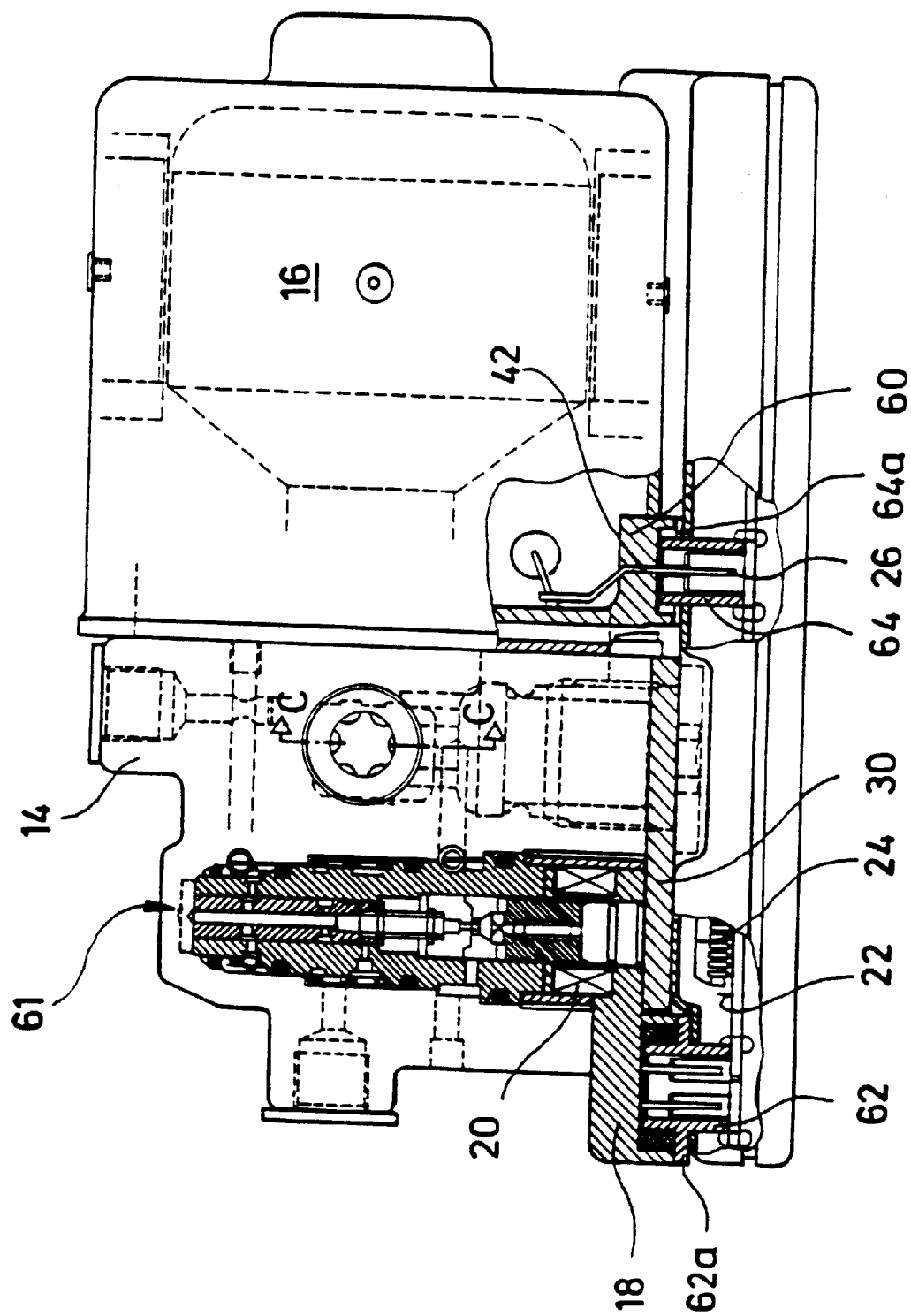
FIG. 3 is a schematic side view of second embodiment with a partial elevational view of part of a housing, a pump motor and a valve block.
Figure 4:
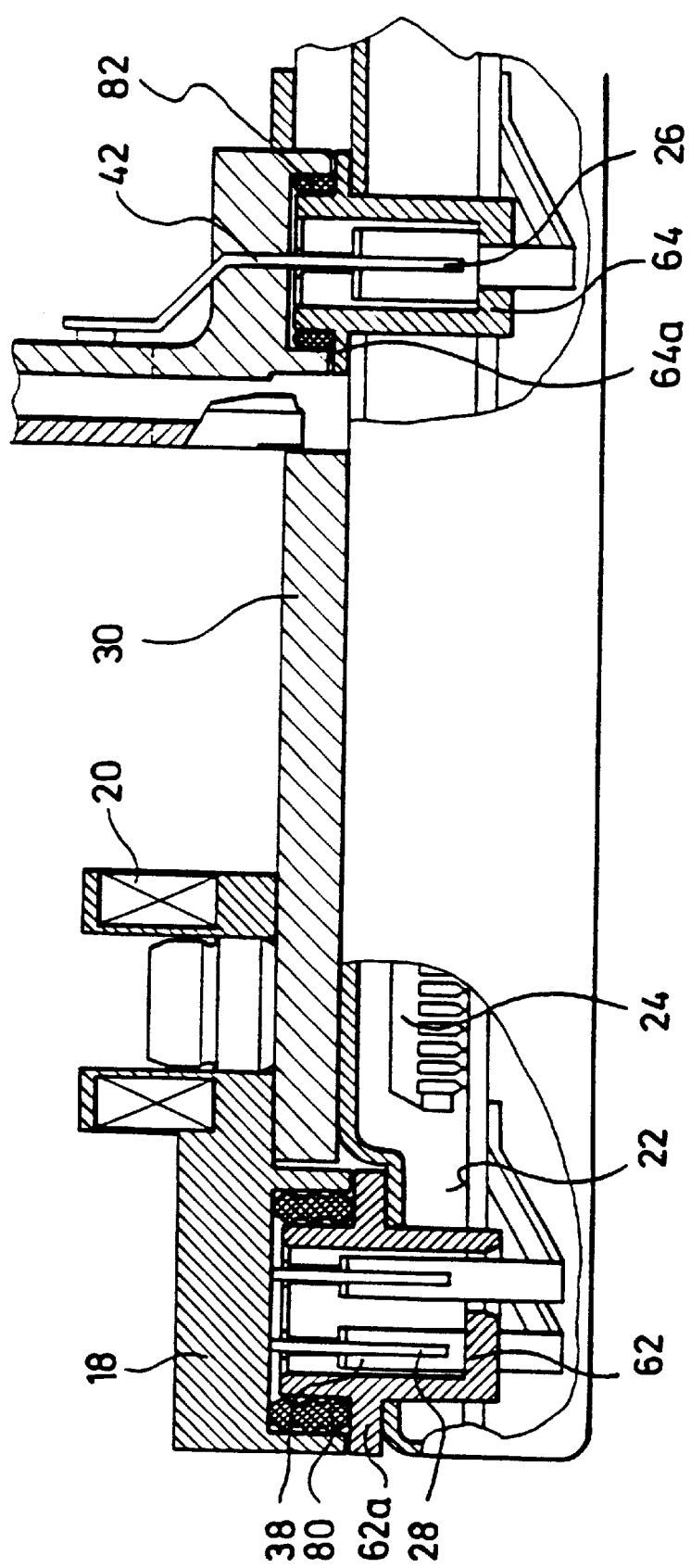
FIG. 4 is a schematic side view of the embodiment of FIG. 3 in an enlarged representation compared to FIG. 3 with a partial elevational view of part of the housing, the pump motor and the valve block.
Figure 5:
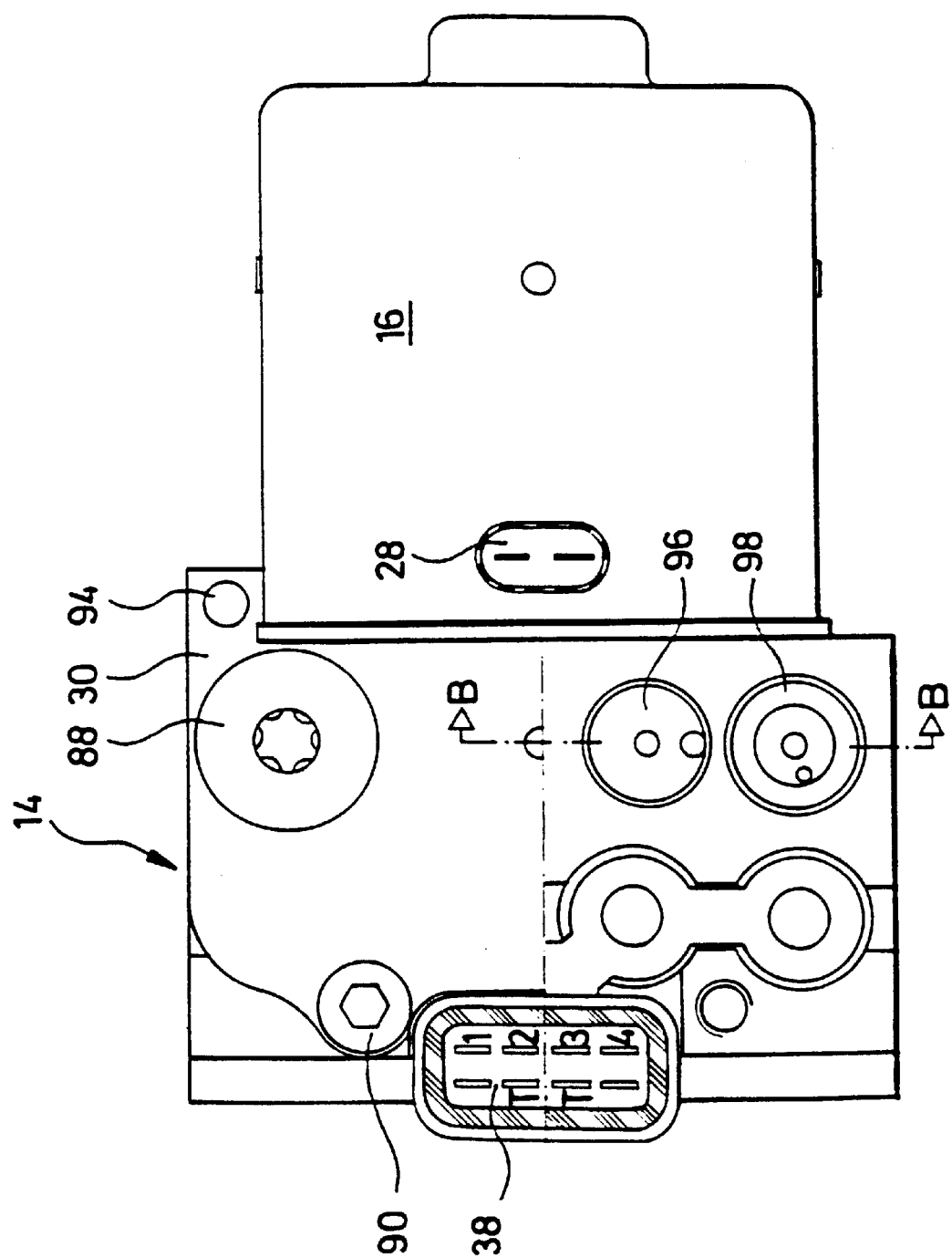
FIG. 5 is a schematic bottom view of the embodiment of FIG. 3 with the housing removed from the pump motor or valve block, respectively.

FIG. 2 is a plan view of the intermediate body 18. As can be seen, four solenoids 20 are accommodatd in the intermediate body 18, with each of the solenoids 20 surrounding a hollow space 32 in which the valve (not shown) or at least a component of the valve (the armature) is arranged.

FIG. 1 shows two exemplary contact pins 26, 28 which project upwards from the printed circuit board 22. In a direction vertically to the drawing plane several of such electric contact pins 38 are arranged one after the other, as can be seen from FIG. 2.

On the housing 12 a supporting plate 30 is attached with a large area of the intermediate body 18 being in contact with same.

An electric line 34 leads to each of the four solenoids 20, which connects each solenoid with a contact terminal 38. The line 34 and the contact terminals 38 are accommodated in the intermediate body 18, with each contact terminal 38 being arranged in one hollow space each in the intermediate body 18. The intermediate body 18 which extends in a horizontal direction comprises a shoulder 18a which extends vertically downwards into the housing 12 of the electronic controller and accommodates the contact terminals 38. The shoulder 18a of the intermediate body 18 is provided with openings in its bottom face through which the contact pins 28 can be pushed for an electrically conducting engagement with the contact terminals 38.

The pump motor 16 comprises a motor block 40 from which a shoulder 40a projects vertically downwards. The shoulder 40a of the motor block accurately fits a recess 36 which is formed in the intermediate body 18 (see also FIG. 2). The shoulder 40a of the motor block 40 accommodates a contact terminal which similar to the above-described contact terminals of the solenoids receives a contact pin 26 of the electronic controller in order to provide an electrical connection between the electronic controller and the pump motor 16. The shoulder 40a also effects a mechanical mounting of the pump motor 16 to the remaining assemblies via the recess 36 in the intermediate body 18. The inner spaces of the pump motor and the housing 12 of the electronic controller are sealed against environmental influences by means of an O-ring 46. Only one further single seal 44 is required to achieve the sealing of the housing 12 and the parts of the intermediate body, which might be susceptible to failure, against environmental influences.

The pump motor 16 is secured at the valve block 14 by means of two screw bolts 50, 52.

A nose 48 of the valve block 14 encompasses the supporting plate 30 to which the housing 12 of the electronic controller is attached. An additional screw connection by means of a correspondingly formed dampening chamber plug 88 ensures a reliable mechanical mounting of the housing 12 at the valve block 14.

FIGS. 3 to 6 illustrate another embodiment of the invention. Parts and assemblies which are similar to those in FIGS. 1 and 2 are assigned identical reference numerals and their repeated detailed description will be omitted.

In this embodiment the pump motor 16 comprises a shoulder 60 which is independent of the intermediate body 18 and which accommodates an electric connection in the form of plug and socket contacts 26, 42 between an electronic controller 22, 24 and the pump motor 16. The shoulder 60 is spatially separated from the intermediate body and projects immediately away from the pump motor 14. In this embodiment the intermediate body 18 is arranged in a similar manner so as to project from the valve block 14. The intermediate body 18 thus accommodates parts of the solenoids 20 of the valves 61 and extends laterally beyond the supporting plate 30 to a first support 62 for the intermediate body 18 which is arranged at the housing 12. On the other side, the shoulder 60 extends in a similar way laterally beyond the supporting plate 30 to a second support 64 for the intermediate body 18 which is arranged at the housing 12.

The first and the second support 62 and 64 are connected with the housing 12 by means of bonding, potting or the like in a dustproof and hermetically sealed manner. Moreover, the first and the second support 62, 64 are connected with the printed circuit board 22 in the housing 12 in a dustproof and hermetically sealed manner.

The first and the second support 62 and 64 are provided with a laterally projecting circumferential collar 62a, 64a each against which a shaped seal 80, 82 each bears which surround the free edge of the first and the second support 62 and 64. Thereby a dustproof and hermetically sealed connection between the valve block 14 or or the pump motor 16, respectively, and the housing 12 is achieved.

Alternatively, the intermediate body 18 and the shoulder 60 can also be arranged in a recess of the supporting plate 30 of the valve block 14 or the pump motor 16, respectively, and provide for the connection with the first or the second support 62 or 64, respectively.

Figure 6:
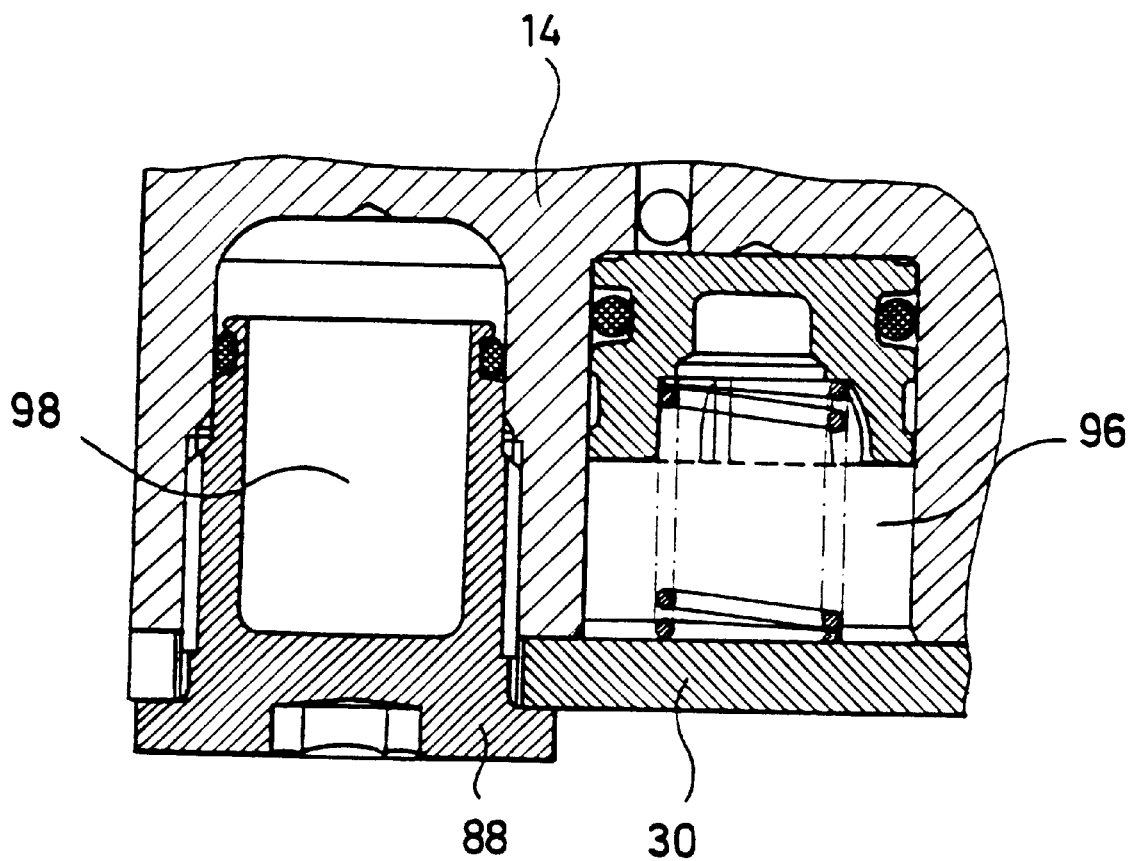
FIG. 6 is a schematic sectional side view through a dampening chamber with a screwed-in dampening chamber plug in a larger scale than that of FIG. 3.

The supporting plate 30 is attached to the valve block 14 (see FIGS. 3 to 6). For this purpose the supporting plate 30 is screwed against the valve block 14 by means of the screw-type damening chamber plug 88. In addition, a screw 90 can be provided for holding the supporting plate 30. An attachment of the supporting plate 30 to the pump motor 16 could also be considered. A through hole 94 serves to enable the screw connection of the housing 12 of the electronic controller with the supporting plate 30. FIG. 6 shows the cross-section through an expansion chamber 96 and a dampening chamber 98 with the dampening chamber plug 88 installed therein.

The embodiment according to the invention improves the heat dissipation behaviour, the ease of assembly and replacement of the electronic controller and the susceptibility to failures and decreases the required installation space.

What is claimed is:

1. A block-protected braking system for a vehicle, comprising:
   an electronic controller (22, 24) arranged in a housing (12);
   a valve block (14) to accommodate solenoid valves for controlling the hydraulic fluid in the braking system;
   a pump motor (16) for a pump which delivers hydraulic fluid and which comprises a shoulder (40a); and
   an intermediate body (18) which is arranged between he valve block (14) and the housing (12) of the electronic controller and which comprises the solenoids (20) of the valves, an electric connecting means (34), a recess (36) for accommodating the shoulder and electric contacts (38), said intermediate body electrically and mechanically associating the valve block (14), he pump motor (16) and the electronic controller (22, 24) with its housing (12) to each other.

2. A braking system according to claim 1 characterized in that the electric connecting means comprise plug and socket contacts (26, 28).

3. A braking system according to claim 1 characterized in that the intermediate body (18) consists of plastic material into which the solenoids (20) and the electrical connecting means (34) are potted or embedded by injection molding.

4. A braking system according to claim 1 characterized in that the valve block (14) and the pump motor (16) are arranged vertically above the housing (12) of the electronic controller (22, 24).

5. A braking system according to claim 1 characterized in that the shoulder (60) of the pump motor (16) is independent of the intermediate body (18) and accommodates an electric connection (26, 42) between the electronic controller (22, 24) and the pump motor (16).

6. A braking system according to claim 5 characterized in that the housing (12) comprises a first support (62) for the intermediate body (18) and a second support (64) for the shoulder (60).

7. A braking system according to claim 6 characterized in that at least one of the first support (62) and the second support (64) are connected with the housing (12) in a dustproof, hermetically sealed manner.

8. A braking system according to claim 6 further comprising a printed circuit board (22) disposed within the housing (12) and characterized in that at least one of the first and the second supports (62, 64) are connected with the printed circuit board (22) in the housing (12) in a dustproof hermetically sealed manner.

9. A braking system according to claim 6 characterized in that the second support (64) accommodates plug and socket contacts (26) between the electronic controller (22, 24) and the pump motor (16).

10. A braking system according to claim 6 characterized in that at least one of the first and the second supports (62, 64) are provided with a seal (80, 82) each which effects a dustproof hermetically sealed connection between the valve block (14) of the pump motor (16) and the housing (12), respectively.

11. A braking system according to claim 10 wherein at least one of the valve block (14) and the pump motor (16) includes a supporting plate (30) having a recess and characterized in that at least one of the intermediate body (18) and the shoulder (60) are arranged laterally adjacent to or in the recess of a supporting plate (30) of the valve block (14) or the pump motor (16), respectively, and provides for the connection with one of the first and the second supports (62, 64).

12. A braking system according to claim 11 characterized in that the supporting plate (30) is screwed to the valve block (14) by means of a dampening chamber plug (88).

13. A braking system according to claim 6 characterized in that at least one of the first and the second supports (62, 64) is surrounded by a seal (80, 82) which axially and radially bears upon the respective support (62, 64), and wherein the intermediate body (18) or the shoulder (60), respectively, encompass the respective seal (80, 82).

14. A braking system according to claim 12 characterized in that the housing (12) of the electronic controller is attached to the supporting plate (30).

15. A braking system according to claim 1 characterized in that the housing (12) of the electronic controller (22, 24) is mechanically secured by means of a nose (48) formed at the valve block (14).

* * * * *